(12) United States Patent
Yum et al.

(10) Patent No.: US 10,117,199 B2
(45) Date of Patent: Oct. 30, 2018

(54) METHOD OF TRANSMITTING CHANNEL STATE INFORMATION AND APPARATUS THEREFOR

(71) Applicant: LG Electronics Inc., Seoul (KR)

(72) Inventors: Kunil Yum, Seoul (KR); Yunjung Yi, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 15/274,687

(22) Filed: Sep. 23, 2016

(65) Prior Publication Data

US 2017/0094547 A1 Mar. 30, 2017

Related U.S. Application Data

(60) Provisional application No. 62/232,413, filed on Sep. 24, 2015.

(51) Int. Cl.
| | |
|---|---|
| *H04W 24/10* | (2009.01) |
| *H04W 56/00* | (2009.01) |
| *H04W 72/04* | (2009.01) |
| *H04L 5/00* | (2006.01) |

(52) U.S. Cl.
CPC .......... *H04W 56/001* (2013.01); *H04L 5/00* (2013.01); *H04W 72/04* (2013.01)

(58) Field of Classification Search
CPC ............... H04W 24/10; H04W 56/001; H04W 72/0453

USPC .................................................. 370/252–329
See application file for complete search history.

(56) References Cited

U.S. PATENT DOCUMENTS

| | | | | |
|---|---|---|---|---|
| 7,639,660 | B2 * | 12/2009 | Kim | H04L 1/005 370/208 |
| 8,462,609 | B2 * | 6/2013 | Berggren | H04L 5/0037 370/203 |
| 8,472,374 | B2 * | 6/2013 | Baldemair | H04J 11/0093 370/328 |
| 9,083,482 | B2 * | 7/2015 | Noh | H04J 11/0053 |
| 9,130,710 | B2 * | 9/2015 | Guo | H04W 72/042 |
| 9,137,075 | B2 * | 9/2015 | Lindoff | H04L 27/0008 |
| 9,572,137 | B2 * | 2/2017 | Noh | H04J 11/0053 |
| 9,596,667 | B2 * | 3/2017 | Awad | H04L 5/001 |
| 9,602,322 | B2 * | 3/2017 | Luo | H04L 27/2662 |
| 9,673,952 | B2 * | 6/2017 | Chen | H04L 5/0053 |

* cited by examiner

*Primary Examiner* — Man U Phan
(74) *Attorney, Agent, or Firm* — Dentons US LLP

(57) ABSTRACT

A method of measuring a channel, which is measured by a terminal configured to operate on two or more frequency bands, each of the frequency bands being configured with a subcarrier spacing different from each other in a wireless communication system, may include performing blind detection on a synchronization signal or a reference signal defined by each subcarrier spacing, determining a subcarrier spacing configured for the terminal according to the detected synchronization signal or the reference signal, and performing channel measurement using the detected synchronization signal or the reference signal.

16 Claims, 6 Drawing Sheets

METHOD OF TRANSMITTING CHANNEL STATE INFORMATION AND APPARATUS THEREFOR

This application claims the benefit of the U.S. Provisional Application No. 62/232,413, filed on Sep. 24, 2015, which is hereby incorporated by reference as if fully set forth herein.

BACKGROUND OF THE INVENTION

Field of the Invention

The present invention relates to a wireless communication system, and more particularly, to a method of transmitting channel state information and an apparatus therefor.

Discussion of the Related Art

A terminal for NB (narrow band)-IoT (internet of things) may operate under an assumption of two or more frequencies including subcarrier spacing different from each other. In baseband, the terminal detects a carrier frequency of a corresponding frequency using such a scheme as a PSS (primary synchronization signal), an SSS (secondary synchronization signal), or the like. In order to transmit an actual data, the terminal may use a frequency different from the baseband. A base station indicates the terminal to measure a channel of the different frequency and the terminal can perform the channel measurement on the frequency using time such as a given measurement gap.

SUMMARY OF THE INVENTION

Accordingly, the present invention is directed to an apparatus and method thereof that substantially obviate one or more problems due to limitations and disadvantages of the related art.

An object of the present invention is to provide a method of finding out a subcarrier spacing of an NB-IoT terminal and an apparatus therefor or a method of informing an NB-IoT terminal of a subcarrier spacing and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of measuring a channel, which is measured by a terminal configured to operate on two or more frequency bands, each of the frequency bands being configured with a subcarrier spacing different from each other in a wireless communication system, may include performing blind detection on a synchronization signal or a reference signal defined by each subcarrier spacing, determining a subcarrier spacing configured for the terminal according to the detected synchronization signal or the reference signal, and performing channel measurement using the detected synchronization signal or the reference signal.

Additionally or alternately, the synchronization signal or the reference signal may be associated with a cell ID (identifier) distinguished for each subcarrier spacing.

Additionally or alternately, the synchronization signal or the reference signal may contain information on a subcarrier spacing.

Additionally or alternately, the reference signal may be mapped to a resource with a resource mapping pattern defined for each subcarrier spacing.

Additionally or alternately, reference signals for all subcarrier spacing may be mapped to a resource with resource mapping patterns having identical density, each of the resource mapping patterns corresponding to respective one of the all subcarrier spacing.

Additionally or alternately, the reference signal may include a sequence initialized by a different scheme according to each subcarrier spacing.

Additionally or alternately, the method may further include transmitting information on a first subcarrier spacing supported or preferred by the terminal to a base station.

Additionally or alternately, the information on the first subcarrier spacing may be transmitted via a selected one among a random access channel resource, a random access channel sequence, and an RNTI (radio network temporary identifier) linked to the first subcarrier spacing.

Additionally or alternately, the method may further include performing switching to a frequency band corresponding to the determined subcarrier spacing in a measurement gap or a switching gap configured for the terminal.

Additionally or alternately, the method may further include receiving, from a base station, an order configuration to report the channel measurement.

To further achieve these objects and other advantages and in accordance with the purpose of the invention, as embodied and broadly described herein, according to a different embodiment, a terminal configured to operate on two or more frequency bands, each of the frequency bands being configured with a subcarrier spacing different from each other in a wireless communication system includes a transmitter and a receiver and a processor configured to control the transmitter and the receiver, perform blind detection on a synchronization signal or a reference signal defined by each subcarrier spacing, determine a subcarrier spacing configured for the terminal according to the detected synchronization signal or the reference signal, and perform channel measurement using the detected synchronization signal or the reference signal.

Additionally or alternately, the synchronization signal or the reference signal may be associated with a cell ID (identifier) distinguished for each subcarrier spacing.

Additionally or alternately, the synchronization signal or the reference signal may contain information on a subcarrier spacing.

Additionally or alternately, the reference signal may be mapped to a resource with a resource mapping pattern defined for each subcarrier spacing.

Additionally or alternately, reference signals for all subcarrier spacing may be mapped to a resource with resource mapping patterns having identical density, each of the resource mapping patterns corresponding to respective one of the all subcarrier spacing.

Additionally or alternately, the reference signal may include a sequence initialized by a different scheme according to each subcarrier spacing.

Additionally or alternately, the processor may be configured to transmit information on a first subcarrier spacing supported or preferred by the terminal to a base station.

Additionally or alternately, the information on the first subcarrier spacing may be transmitted via a selected one of a random access channel resource, a random access channel sequence, and an RNTI (radio network temporary identifier) linked to the first subcarrier spacing.

Additionally or alternately, the processor may be configured to perform switching to a frequency band corresponding to the determined subcarrier spacing in a measurement gap or a switching gap configured for the terminal.

Additionally or alternately, the processor may be configured to receive, from a base station, an order configuration to report the channel measurement.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
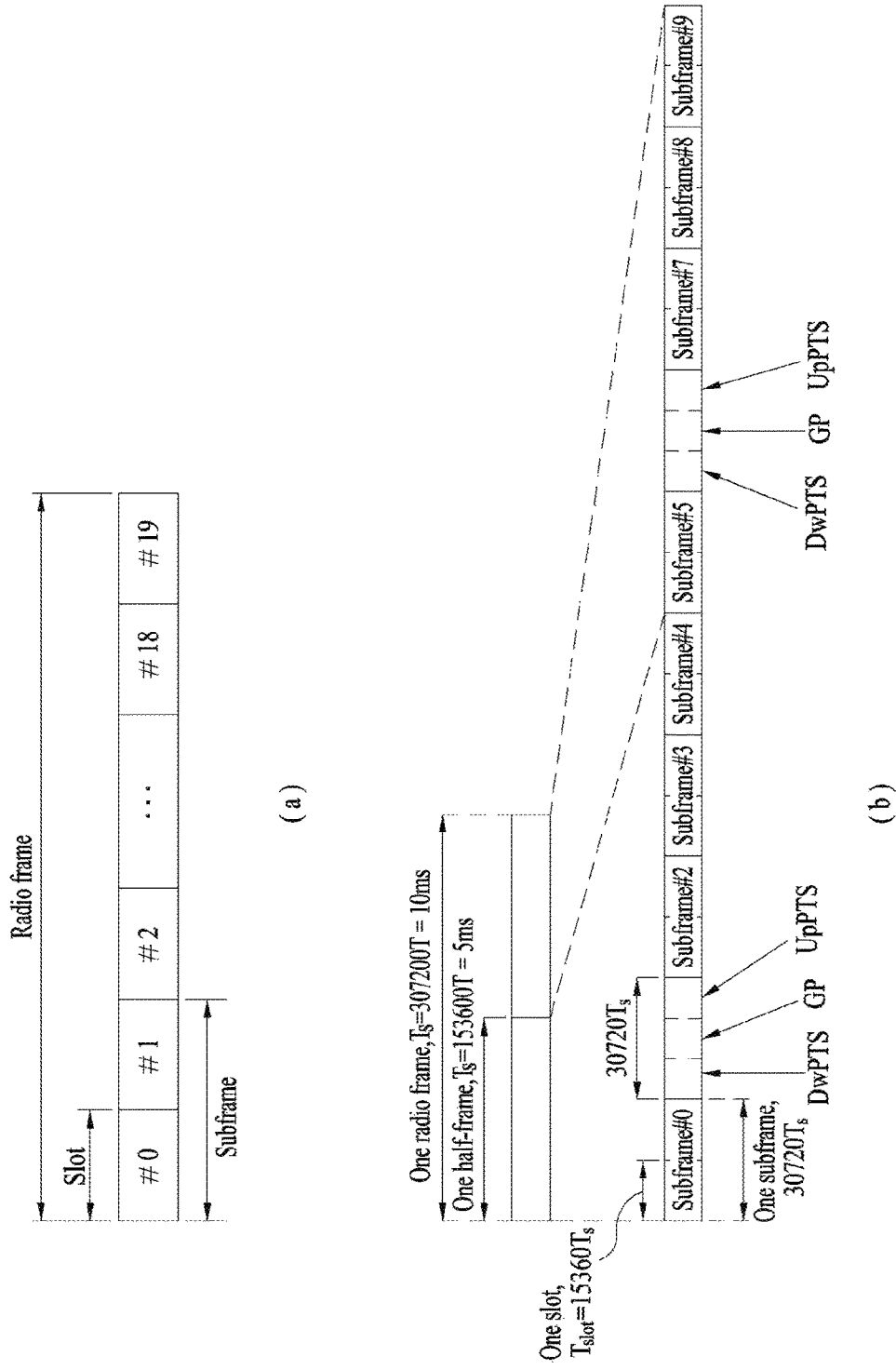
FIG. 1 is a diagram for an example of a radio frame structure used in a wireless communication system.

Reference will now be made in detail to the preferred embodiments of the present invention, examples of which are illustrated in the accompanying drawings. Wherever possible, the same reference numbers will be used throughout the drawings to refer to the same or like parts.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$  | $2192 \cdot T_S$ | $2560 \cdot T_S$ | $7680 \cdot T_S$  | $2192 \cdot T_S$ | $2560 \cdot T_S$ |
| 1 | $19760 \cdot T_S$ |                  |                  | $20480 \cdot T_S$ |                  |                  |
| 2 | $21952 \cdot T_S$ |                  |                  | $23040 \cdot T_S$ |                  |                  |
| 3 | $24144 \cdot T_S$ |                  |                  | $25600 \cdot T_S$ |                  |                  |
| 4 | $26336 \cdot T_S$ |                  |                  | $7680 \cdot T_S$  |                  |                  |
| 5 | $6592 \cdot T_S$  | $4384 \cdot T_S$ | $5120 \cdot T_S$ | $20480 \cdot T_S$ | $4384 \cdot T_S$ | $5120 \cdot T_S$ |
| 6 | $19760 \cdot T_S$ |                  |                  | $23040 \cdot T_S$ |                  |                  |
| 7 | $21952 \cdot T_S$ |                  |                  | $12800 \cdot T_S$ |                  |                  |
| 8 | $24144 \cdot T_S$ |                  |                  | —                 | —                | —                |
| 9 | $13168 \cdot T_S$ |                  |                  | —                 | —                | —                |

Figure 2:
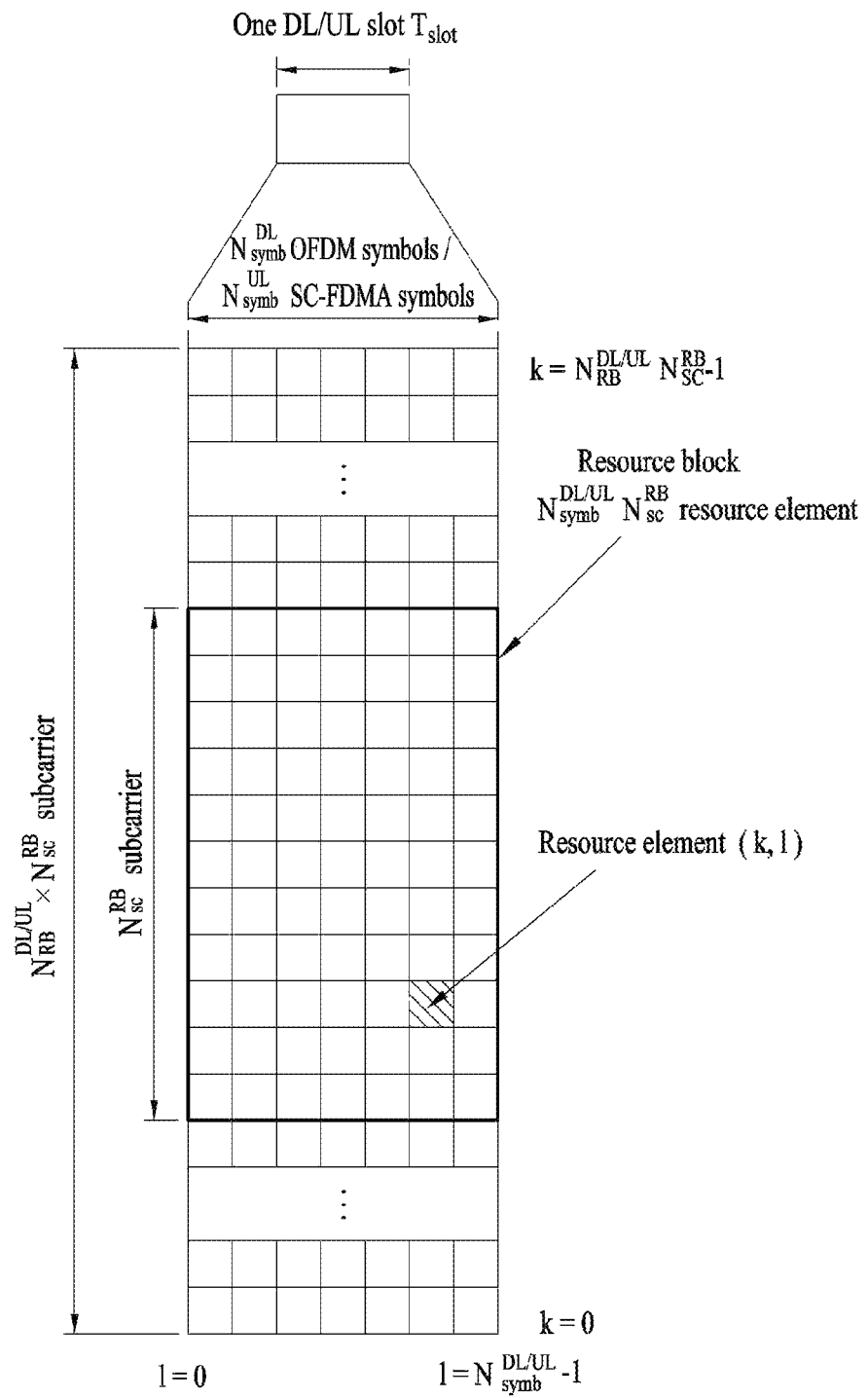
FIG. 2 is a diagram for an example of a structure of a downlink/uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
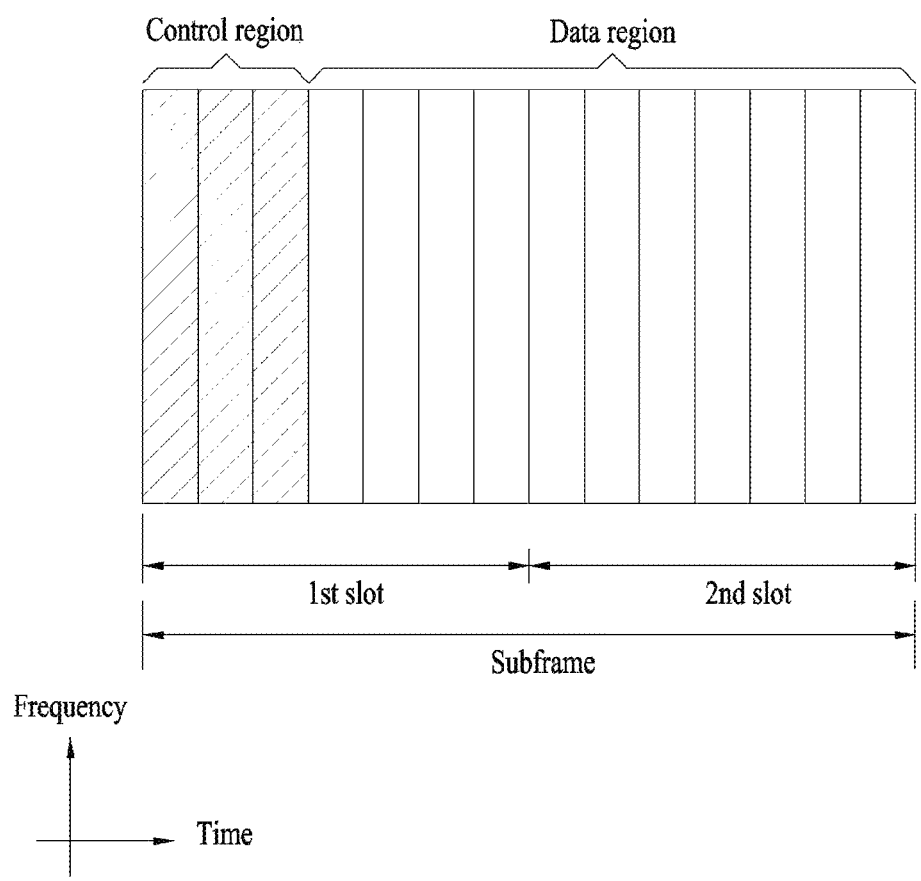
FIG. 3 is a diagram for an example of a structure of a downlink (DL) subframe in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
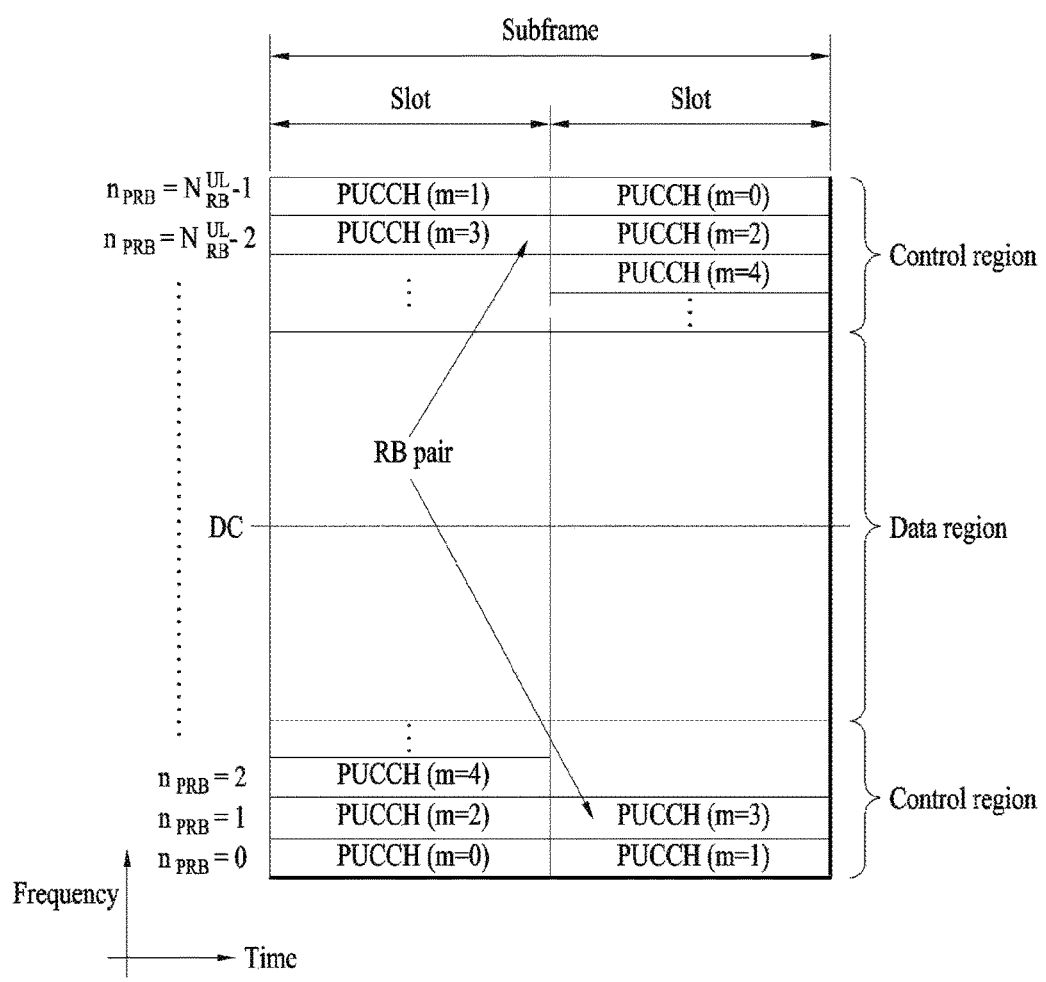
FIG. 4 is a diagram for an example of a structure of an uplink (DL) subframe in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

| | PMI Feedback Type | | |
|---|---|---|---|
| | No PMI | Single PMI | Multiple PMIs |
| PUSCH CQI Feedback Type | Wideband (Wideband CQI) | | Mode 1-2 RI 1st wideband CQI(4 bit) 2nd wideband CQI(4 bit) if RI > 1 N*Subband PMI(4 bit) (N is the total # of subbands) (if 8Tx Ant, |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI(4 bit) + Best-M CQI(2 bit)<br>(Best-M CQI: average CQI for selected M SB(s) among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI(4 bit) + N*subbandCQI (2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant, N*subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

A terminal for NB (narrow band)-IoT (internet of things) may operate under an assumption of two or more frequencies including subcarrier spacing different from each other. In baseband, the terminal detects a carrier frequency of a corresponding frequency using such a scheme as a PSS (primary synchronization signal), an SSS (secondary synchronization signal), or the like. In order to transmit an actual data, the terminal may use a frequency different from the baseband. A base station indicates the terminal to measure a channel of the different frequency and the terminal can perform the channel measurement on the frequency using time such as a given measurement gap.

In this case, the NB-IoT assumes a situation capable of using a subcarrier spacing different from the baseband including a characteristic (e.g., subcarrier spacing) promised with a terminal in advance in a downlink frequency. Or, it may assume a situation that a different subcarrier spacing is used on a frequency different from a frequency on which the terminal is operating. In the present specification, for clarity, although it is assumed/explained that a subcarrier spacing is selected from among 15 kHz and 3.75 kHz on an operating frequency of which baseband is different, a corresponding technology can also be applied to a different subcarrier spacing. In this situation, it may be necessary for a terminal to have separate time for returning a center frequency and readjusting subcarrier spacing. Although the terminal is able to perform inter-frequency measurement without a measurement gap, since a subcarrier spacing is different from a subcarrier spacing operating on an operating frequency, unless a subcarrier spacing of a baseband is changeable according to each frequency, a base station can set a measurement gap to the terminal to measure frequencies different from each other irrespective of the number of carriers supported by the terminal at the same time.

Compared to a legacy system, a synchronization signal can be intermittently transmitted in such a new system as IoT and the like to reduce overhead of the synchronization signal. If a transmission period of the synchronization signal is changed, a section for listening to at least one or more synchronization signals via a measurement gap between networks in an asynchronous state can be considerably extended. Hence, a measurement interval or a gap can be extended according to the aforementioned structure. Or, overhead for performing inter-frequency measurement can be reduced in a manner that a serving cell provides assistance information for the measurement. Or, if it is assumed that a UE is static in general, the UE performs inter-frequency measurement from time to time when the UE is in DRX or IDLE. And, the UE can report a result of the measurement to a serving cell when the UE accesses the serving cell. In particular, while the UE follows a procedure of an IDLE situation for the measurement itself, the UE can report a measurement result on a neighboring cell when the UE enters an accessed state. Assume that information on a period of searching for a frequency and information on the number of frequencies to be searched may vary depending on UE implementation or the information can be recommended by a network. The information can be used for measuring other IoT devices as well. When a report is made, it may be able to assume that new results are transmitted only. By doing so, it may be able to reduce overhead. In summary, It is not mandatory that an IoT device performs measurement in RRC_CONNECTED state. Unless a network explicitly configures the IoT device to perform measurement, the IoT device may not perform measurement.

Depending on UE implementation, a UE can perform measurement when the UE is in off state such as DRX or the like.

A UE can report a result of measurement measured in off state or the like after the UE accesses a network. A report can be performed only when a network asks the report, a report can always be performed after the UE accesses a network, or a report can be triggered based on a threshold.

Figure 5:
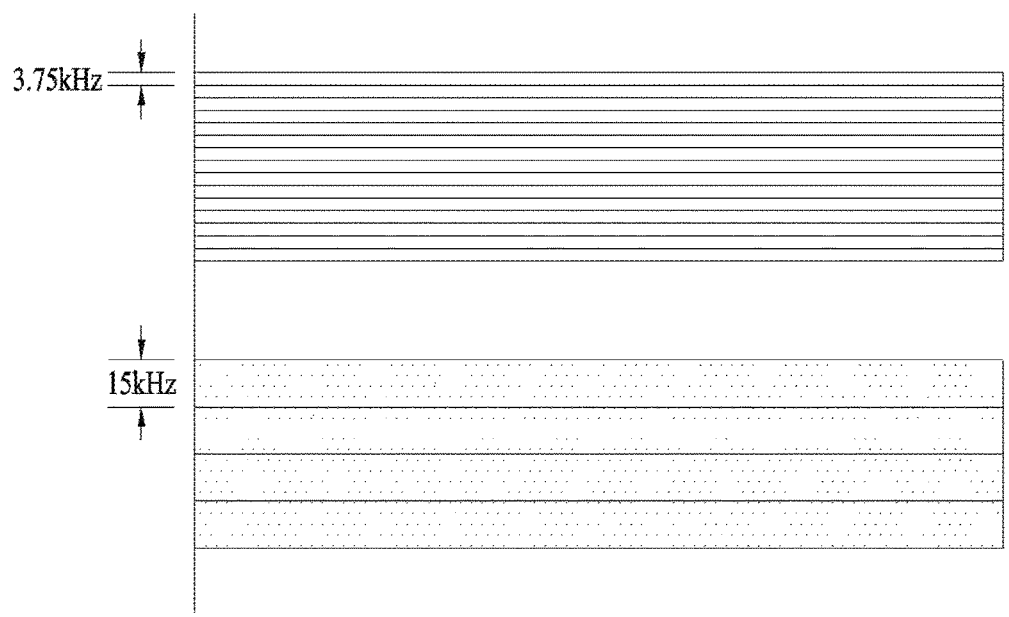
FIG. 5 is a diagram for an example that two subcarrier spacing including 3.75 kHz and 15 kHz frequency band are set to a UE.

When the aforementioned mechanism is used, it may be not necessary for a UE to have a measurement gap. Yet, for example, a data is transmitted using a subcarrier spacing or S1, whereas a synchronization signal or a specific signal can be transmitted using a different subcarrier spacing or S2. In this case, if a subcarrier spacing switching latency of a UE is required, it can be supported by a measurement gap or a switching gap. Or, it can be supported in a manner that a UE does not perform downlink data reception during a switching period. FIG. 5 is a diagram for an example that two subcarrier spacing including 3.75 kHz and 15 kHz frequency band are set to a UE.

In this case, a base station can set a period longer than a measurement gap capable of being set to a UE to the UE. For example, it may be able to set K multiple of measurement given to MTC and the like to the UE. In this case, the K can be set to the UE via predetermined signaling or RRC signaling.

Subsequently, the UE can perform channel estimation on a frequency including a subcarrier spacing different from a subcarrier spacing of a baseband using the measurement gap or the like. To this end, it is necessary for the UE to know information on the subcarrier spacing of the frequency. It may be able to consider methods described in the following.

Alt 1. Blind Detection

Alt 1-1. A base station transmits a full synchronization signal (e.g., PSS/SSS) differently defined according to each subcarrier spacing and a UE can determine a subcarrier spacing of a corresponding frequency by performing blind detection on a full synchronization signal for each carrier frequency.

In this case, the UE can perform channel measurement using the full synchronization signal.

Alt 1-2. A common full synchronization signal (e.g., PSS/SSS) is used for each subcarrier spacing and it may be able to configure the synchronization signal to provide information on a subcarrier spacing.

For example, a cell ID space of a PSS/SSS can be designated to a UE in a manner of being divided according to each subcarrier spacing (e.g., 1-100: 3.75 kHz, 101-200: 15 kHz).

Or, the aforementioned information can be added to a sequence of an SSS.

In this case, it may be able to perform measurement on a channel that a corresponding synchronization signal is used.

Alt 1-3. If an additional synchronization signal different from each other according to each subcarrier spacing is defined and transmitted irrespective of synchronization in a baseband, a UE can determine a subcarrier spacing of a corresponding frequency by performing blind detection on two synchronization signals.

In this case, it may be able to introduce a new short signal as the aforementioned additional synchronization signal.

Or, it may use an SSS as the aforementioned additional synchronization signal. In this case, a cell ID space of the SSS can be divided according to each subcarrier spacing (e.g., 1-100: 3.75 kHz, 101-200: 15 kHz).

In this case, the UE may be able to perform measurement on a channel that the additional synchronization signal is used.

When the UE uses a corresponding frequency after sleep, it is not necessary for the UE to separately detect a synchronization signal of a baseband.

Alt 1-4. It may be able to define and transmit an additional synchronization signal common to a subcarrier spacing irrespective of synchronization in a baseband and a subcarrier spacing and necessary information can be transmitted via the additional synchronization signal. The necessary information may correspond to information on such a frame structure as a subcarrier spacing, a CP (cyclic prefix) length to be used, a frame structure (or a length of TTI) and information on a resource block configuration.

Alt 1-5. It may be able to define reference signals different from each other according to a subcarrier spacing. A UE performs blind detection on the reference signals to check a subframe spacing and perform channel measurement.

The reference signals can be distinguished from each other by a pattern mapped to a resource. For example, if a subframe spacing corresponds to 15 kHz, it may use a CRS (cell-specific reference signal) of legacy LTE or an additional RS. And, for example, if a subframe spacing corresponds to 3.75 kHz, it may use a new RS.

In the aforementioned two cases, the RSs can maintain identical density for the purpose of band detection and the like.

As a different example, the reference signals can be distinguished from each other by a sequence. For example, a different initialization scheme can be applied to an identical sequence.

For example, if a subcarrier spacing corresponds to 3.75 kHz, a length-31 gold sequence is used and the gold sequence can be initialized by a PCID (physical cell identifier), a frequency index at which a burst starts, and a time index.

Sequence Length 8. That is, there are 48 subcarriers of 3.75 KHz subcarrier spacing in one RB when 180 KHz bandwidth is used as one RB, which is the same as the 15 KHz subcarrier spacing is used. In this case, if RS density (i.e., 1 RE per 6 subcarrier), which is the same as the CRS is used, sequence length 8 may be used according to the sequence definition as discussed above.

For example, if a subcarrier spacing corresponds to 15 kHz, a length-31 gold sequence is used and the gold sequence can be initialized by a PCID (physical cell identifier), a CP, a slot number, and a symbol number.

Sequence Length 2. That is, there are 12 subcarriers of 15 KHz subcarrier spacing in one RB when 180 KHz bandwidth is used as one RB, which is the same as the 15 KHz subcarrier spacing is used. In this case, if RS density (i.e., 1 RE per 6 subcarrier), which is the same as the CRS is used, sequence length 2 may be used according to the sequence definition as discussed above.

As a different example, the reference signals can be distinguished from each other by a modulation scheme.

For example, the reference signals can be distinguished from each other by BPSK and QPSK.

That is, a base station transmits the RS sequence comprising of the above sequence to a terminal, with a different modulation scheme per subcarrier spacing. For example, a QPSK modulated RS sequence is transmitted when 15 KHz of subcarrier spacing is used and a BPSK modulated RS sequence is transmitted when 3.75 KHz of subcarrier spacing is used. In this case, a method for generating the BPSK modulated RS sequence is a needed length of bits selected among a sequence, which is generated according to the above discussed method for generating the sequence (a length-31 gold sequence is used and the gold sequence can be initialized by a PCID (physical cell identifier), a CP, a slot number, and a symbol number).

Alt 2. Signaling

Alt 2-1. When a base station indicates a UE to perform measurement, the base station can inform the UE of a target frequency and a subcarrier spacing of the frequency.

In this case, a frequency index can be assigned according to each subcarrier spacing. In other word, assume that a subcarrier spacing, which is used according to a frequency, is known to the UE in advance. As an example, a subcarrier spacing can be determined according to a frequency range. Or, the subcarrier spacing can also be determined in a manner of being divided by a guard band, GSM band/LTE band, or the like. No manner what scheme is used for determining the subcarrier spacing, it may assume that the subcarrier spacing corresponds to a value capable of being known to the UE in a manner of being defined in a standard document.

For example, if a subframe spacing corresponds to 15 kHz, a frequency index is assigned by one among 0 to 100. If a subframe spacing corresponds to 30 kHz, a frequency index can be assigned by one among 0 to 100.

Alt 2-2. It may be able to inform a UE of a subframe spacing according to each frequency in advance via higher layer signaling or the like. In this case, assume that the UE has accessed a base station in advance.

Alt 2-3. When an index is assigned to each frequency, each index can be assigned in accordance with a subcarrier spacing according to a relationship between a frequency index and a subcarrier spacing defined in advance or defined by higher layer signaling.

For example, frequency indexes 0 to 100 are assigned to a subcarrier spacing 15 kHz and frequency indexes 101 to 200 are assigned to a subcarrier spacing 30 kHz.

Alt 2-4. Each cell can broadcast information on a subcarrier spacing for a neighboring frequency (a frequency band, e.g., a frequency band for MTC/IoT data communication) and information on a frame structure. Hence, a UE capable of listening to a cell can obtain information on a neighboring frequency. The information can be transmitted via such a broadcast message as an SIB (system information block) and the like or the information can be transmitted to the UE via higher layer signaling according to the request of the UE.

In particular, if a UE is in an idle state, it may be difficult to apply a higher layer signaling method. Yet, if it is assumed that a frame structure is dynamically used according to each frequency and the frame structure is cable of being changed by a TDM scheme, it may be necessary to have a reference carrier on which the aforementioned information is transmitted. As an example, the reference carrier may correspond to a LTE legacy carrier. Information on a frame structure used by a neighboring frequency and information on a subcarrier spacing can be delivered on the LTE legacy carrier.

Yet, in order to support such a UE operating on a new RAT only as an IoT device and the like, which are unable to listen to broadcasting on the legacy carrier, the new RAT can deliver the information on the frame structure used by the neighboring frequency and the information on the subcarrier spacing. Yet, in order to support such a UE operating on a new RAT only as an IoT device and the like incapable of listening to broadcasting on the legacy carrier, it is necessary for the new RAT to have a reference carrier. For the aforementioned operation, it may assume that a fixed frame structure and a subcarrier spacing are used in a section in which SIB and the like are transmitted by at least one or more reference carriers. Or, it may assume that broadcast messages have a common frame structure and a subcarrier spacing irrespective of a frame structure and a subcarrier spacing used by a corresponding carrier. The aforementioned assumption may have various demerits. Hence, the assumption may be valid only under an assumption that broadcasting is very limitative.

The same issue can be considered to support an MBMS (multimedia broadcast multicast service). A subcarrier spacing of the MBMS and a subcarrier spacing of a unicast part may be different from each other. Hence, MBMS information can include the aforementioned information (e.g., a subcarrier spacing) and the like.

If the aforementioned information does not exist, a UE can perform cell search and measurement under a single assumption. In particular, if there exist a plurality of subcarrier spacing values, it may assume priority among a plurality of the values.

After a subcarrier spacing of a corresponding frequency is found out using the aforementioned method, if channel measurement via a synchronization signal is not performed, a UE can perform channel measurement using a general RS (e.g., a pattern, a sequence, etc.) defined according to each subcarrier spacing.

A base station can set a measurement/reporting order to a UE. When a measurement report is made, the base station determines a result of a measurement report measured for a frequency according to the reporting order. The measurement/reporting order can be configured as follows.

Define in Advance

Priority is given to a subcarrier spacing prior to a frequency index and an order can be determined according to each of a size of a subcarrier spacing and a size of a frequency index and an index ascending order.

For example, a report can be made in an order of a frequency 1 and 2 of a subcarrier spacing 3.75 kHz and then a frequency 1 and 2 of a subcarrier spacing of 15 kHz.

And, a measurement/reporting order can be determined according to a frequency index. For example, the measurement/reporting order can be determined in an ascending order of frequency indexes.

Signaling

It may be able to inform a UE of the measurement/reporting order via such a method as higher layer signaling or the like.

The aforementioned operation corresponds to an operation for a UE supporting dual subcarrier spacing including 15 kHz and 3.75 kHz. If a UE corresponds to a UE supporting either 15 kHz or 3.75 kHz, the UE signals information on subcarrier spacing capability of the UE to a base station and the UE can operate in a manner of assuming all subcarrier spacing as a subcarrier spacing at which the UE is operable.

If the base station indicates the UE to perform an operation for a band including a subcarrier spacing not usable by the UE, the UE can report information (e.g., "out of range") corresponding to detection failure to the base station instead of performing the operation. Subsequently, the UE can retransmit the information on the subcarrier spacing capability of the UE to the base station.

In the present specification, subcarrier spacing information can be replaced with an in-band operation and a standalone operation, respectively. In this case, a UE receives a corresponding part and may be able to select one selected from the group consisting of an in-band operation mode, a standalone operation mode, a guard band operation mode, and an additionally defined operation mode as an operation of the UE.

Although the aforementioned operation mainly concerns an operation on a second frequency operating based on a connected mode, i.e., an operation for a data communication for MTC/IoT since a UE is able to perform a baseband operation of which a subcarrier spacing of the baseband is already known to the UE, the aforementioned method of detecting each subcarrier spacing can also be applied to a case of using a single frequency including one subcarrier spacing. In particular, if a UE corresponds to a UE supporting one subcarrier spacing only among subcarrier spacing different from each other (15 kHz/3.75 kHz), it is necessary to have an operation of determining whether or not a frequency to be used by the UE corresponds to a subcarrier spacing capable of being used by the UE.

If a base station does not have information on subcarrier spacing capability of a UE and the base station is unable to receive the information (e.g., initial access), the UE performs cell search by assuming a subcarrier spacing used by the UE. If the UE fails to perform the cell search, the UE can perform the aforementioned procedure on a different frequency.

Or, although a UE has a PSS/SSS/PBCH capable of being interpreted by the UE (e.g., a common PSS/SSS/PBCH), if an actual operation is performed on a different frequency/subcarrier spacing, it may be able to make the UE know a subcarrier spacing in a random access step.

A method for a UE to signal a subcarrier spacing supported or preferred by the UE is explained in the following.

Resource Separation

Random access resources divided by time/frequency are defined by RACH and a UE attempts to perform random access via the RACH connected with a subcarrier spacing preferred by the UE (or, a subcarrier spacing capable of being performed by the UE). A base station identifies a resource used for performing the RACH procedure of the UE and may be able to return a random access response (RAR) via a frequency including the subcarrier spacing preferred by the UE. The frequency should be defined in advance or should be transmitted to the UE via SIB or the like.

Using a Different Sequence

If a different RACH sequence connected with a different subcarrier spacing is defined, a UE can attempt to perform random access using a RACH sequence connected with a subcarrier spacing capable of being used by the UE. A base station identifies a RACH sequence used for performing the random access of the UE and may be able to return a RAR via a frequency including a subcarrier spacing preferred by the UE. The frequency should be defined in advance or should be transmitted to the UE via SIB or the like.

Using a Different RNTI by a Base Station

A UE attempts to perform random access via a RACH. When a base station transmits a RAR to the UE, the base station can transmit the RAR using RNTI including a subcarrier spacing preferred by the UE. The UE interprets the RAR using RNTI connected with a subcarrier spacing capable of being used by the UE. If the UE fails to perform the random access, the UE retries the random access. If the base station fails to receive a random access procedure message 3 (e.g., UL data) from the UE, the base station can transmit a RAR using a different RNTI (in response to a corresponding timing or a next random access attempt of the same UE).

Or, the base station respectively transmits RARs using two RNTIs and the UE can select a subcarrier spacing capable of being used by the UE in a manner of making a response to an RAR received by the UE. To this end, C-RNTI can be divided into groups different from each other according to each subcarrier spacing.

If the base station is able to receive information on subcarrier spacing capability of the UE or the information is signaled to the base station in advance (e.g., switching to a connected mode from a sleep mode), the base station can inform the UE of a frequency corresponding to a subcarrier spacing and may be able to make the UE use the frequency. Or, while the UE uses the aforementioned RACH procedure, both the base station and the UE can operate by assuming a subcarrier spacing capable of being used by the UE.

The aforementioned method of detecting a subcarrier spacing using the RACH can also be applied to a case that a UE is able to use two or more subcarrier spacing. In this case, the UE preferentially performs random access to a subcarrier spacing preferred by the UE. If the UE fails to perform the random access, the UE can perform random access again to a different subcarrier spacing.

Figure 6:
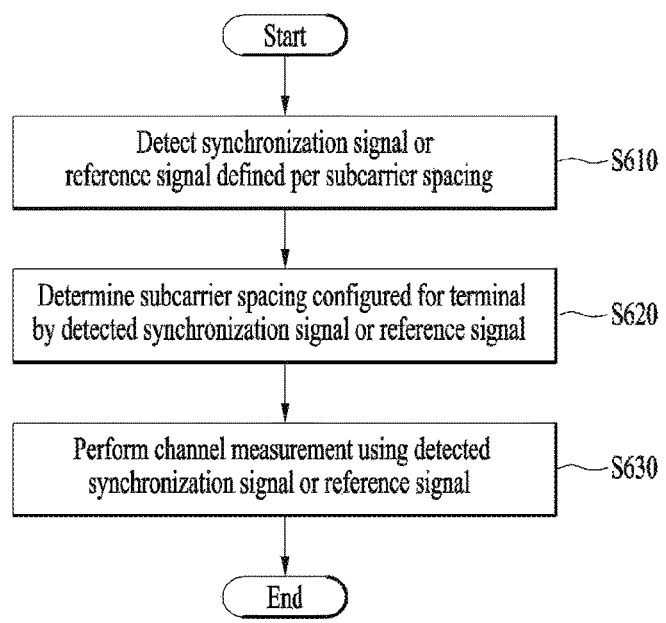
FIG. 6 is a flowchart for an operation according to one embodiment of the present invention.

FIG. 6 is a flowchart for an operation according to one embodiment of the present invention.

The invention shown in FIG. 6 relates to a method of measuring a channel of a UE configured to operate on two or more frequency bands including subcarrier spacing different from each other in a wireless communication system.

A UE can perform blind detection on a synchronization signal or a reference signal which is defined according to a subcarrier spacing [S610]. The UE can determine a subcarrier spacing configured for the UE based on the detected synchronization signal or the reference signal [S620]. The UE can perform channel measurement using the detected synchronization signal or the reference signal [S630].

The synchronization signal or the reference signal can be associated with a cell ID (identifier) distinguished from each other according to each subcarrier spacing. And, the synchronization signal or the reference signal can include information on a subcarrier spacing. And, the reference signal can have a resource mapping pattern different from each other according to each subcarrier spacing. In this case, reference signals for all subcarrier spacing can have resource mapping patterns including identical density.

And, the reference signal can include a sequence differently initialized according to each subcarrier spacing.

The UE can transmit information on a first subcarrier spacing supported or preferred by the UE. The information on the first subcarrier spacing can be transmitted by one selected from the group consisting of a random access channel resource, a random access channel sequence, and an RNTI (radio network temporary identifier) connected with the first subcarrier spacing.

The UE can perform switching to a frequency band corresponding to the determined subcarrier spacing in a measurement gap or a switching gap configured for the UE. And, the UE can receive an order configuration for reporting the channel measurement from the base station.

Although the embodiments according to the present invention are briefly explained with reference to FIG. 6, embodiment related to FIG. 6 can alternately or additionally include at least a part of the aforementioned embodiment(s).

Figure 7:
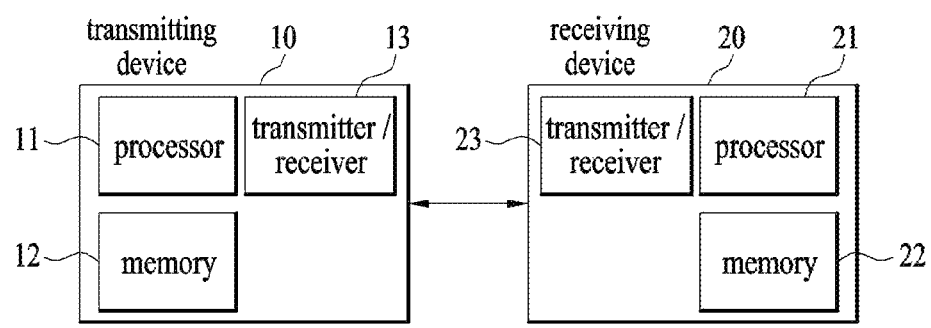
FIG. 7 is a block diagram for a device for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for measuring a channel by a terminal configured to operate on two or more frequency bands, each of the frequency bands being configured with a subcarrier spacing different from each other, in a wireless communication system, the method comprising:
performing blind detection on a synchronization signal or a reference signal defined by each subcarrier spacing;
determining a subcarrier spacing configured for the terminal according to the detected synchronization signal or the reference signal; and
performing channel measurement using the detected synchronization signal or the reference signal,
wherein the reference signal is mapped to a resource with a resource mapping pattern defined for each subcarrier spacing, and
wherein reference signals for all subcarrier spacing are mapped to a resource with resource mapping patterns having identical density, each of the resource mapping patterns corresponding to a respective one of all the subcarrier spacing.

2. The method of claim 1, wherein the synchronization signal or the reference signal is associated with a cell ID (identifier) distinguished for each subcarrier spacing.

3. The method of claim 1, wherein the synchronization signal or the reference signal contains information on a subcarrier spacing.

4. The method of claim 1, wherein the reference signal comprises a sequence initialized by a different scheme according to each subcarrier spacing.

5. The method of claim 1, further comprising:
transmitting information on a first subcarrier spacing supported or preferred by the terminal to a base station.

6. The method of claim 5, wherein the information on the first subcarrier spacing is transmitted via a selected one among a random access channel resource, a random access channel sequence, and an RNTI (radio network temporary identifier) linked to the first subcarrier spacing.

7. The method of claim 1, further comprising:
performing switching to a frequency band corresponding to the determined subcarrier spacing in a measurement gap or a switching gap configured for the terminal.

8. The method of claim 1, further comprising:
receiving, from a base station, an order configuration to report the channel measurement.

9. A terminal configured to operate on two or more frequency bands, each of the frequency bands being configured with a subcarrier spacing different from each other in a wireless communication system, the terminal comprising:
a transmitter and a receiver; and
a processor, operatively connected to the transmitter and the receiver, that:

controls the transmitter and the receiver,
performs blind detection on a synchronization signal or a reference signal defined by each subcarrier spacing,
determines a subcarrier spacing configured for the terminal according to the detected synchronization signal or the reference signal, and
performs channel measurement using the detected synchronization signal or the reference signal,
wherein the reference signal is mapped to a resource with a resource mapping pattern defined for each subcarrier spacing, and
wherein reference signals for all subcarrier spacing are mapped to a resource with resource mapping patterns having identical density, each of the resource mapping patterns corresponding to a respective one of all the subcarrier spacing.

10. The user equipment of claim 9, wherein the synchronization signal or the reference signal is associated with a cell ID (identifier) distinguished for each subcarrier spacing.

11. The user equipment of claim 9, wherein the synchronization signal or the reference signal contains information on a subcarrier spacing.

12. The user equipment of claim 9, wherein the reference signal comprises a sequence initialized by a different scheme according to each subcarrier spacing.

13. The user equipment of claim 9, wherein the processor further controls the transmitter to transmit information on a first subcarrier spacing supported or preferred by the terminal to a base station.

14. The user equipment of claim 13, wherein the information on the first subcarrier spacing is transmitted via a selected one among a random access channel resource, a random access channel sequence, and an RNTI (radio network temporary identifier) linked to the first subcarrier spacing.

15. The user equipment of claim 9, wherein the processor further performs switching to a frequency band corresponding to the determined subcarrier spacing in a measurement gap or a switching gap configured for the terminal.

16. The user equipment of claim 9, wherein the processor further controls the receiver to receive, from a base station, an order configuration to report the channel measurement.

* * * * *